United States Patent [19]
Kalman

[11] 3,718,399
[45] Feb. 27, 1973

[54] DISTANCE COMPENSATED REFLECTANCE SENSOR

[76] Inventor: Gabor U. Kalman, 363 Brook Street, Bristol, Conn. 06010

[22] Filed: June 29, 1971

[21] Appl. No.: 158,044

[52] U.S. Cl. ................356/210, 356/173, 356/212, 356/227
[51] Int. Cl..........G01n 21/48, G01j 3/46, G01j 3/42
[58] Field of Search......356/168, 173, 195, 209, 212, 356/229, 227

[56] References Cited

UNITED STATES PATENTS

| | | | |
|---|---|---|---|
| 2,358,020 | 9/1944 | Miller | 356/195 |
| 1,974,880 | 9/1934 | Smith | 356/195 |
| 3,396,280 | 8/1968 | Knudsen | 356/209 |
| 3,376,425 | 4/1968 | Kraus et al. | 356/173 |
| 3,421,821 | 1/1969 | Alessi | 356/209 |

FOREIGN PATENTS OR APPLICATIONS

| | | | |
|---|---|---|---|
| 91,649 | 1959 | Netherlands | 356/209 |

*Primary Examiner*—William L. Sikes
*Assistant Examiner*—V. P. McGraw
*Attorney*—Fishman and Van Kirk

[57] ABSTRACT

A distance compensated reflectance sensor is presented having a hand held sensing unit for sensing reflectance from surfaces to be measured and generating a signal thereof to be delivered to a main unit where the signal is compared with preset standards or limits for generation of a warning signal if the measured reflectance departs from desired values. The hand held sensor element has a light source, a detector element, and a baffle structure. The baffle provides a partial overlap of the illuminated field and the viewing field, to provide for automatic compensation in the event of the deviation in distance between the surface being examined and the detector element. The source, the detector, and the baffle are arranged so that all direct and directly reflected light are blocked from the detector, i.e., the detector sees only scattered light.

6 Claims, 9 Drawing Figures

Inventor
Gabor U. Kalman

By Fishman & VanKirk
Attorneys

DISTANCE COMPENSATED REFLECTANCE SENSOR

BACKGROUND OF THE INVENTION

1. Field of the Invention

This invention relates to the field of color comparison. More particularly, this invention relates to the field of photoelectric light comparators for comparing the coloring of material, such as, for example, wallpaper and cloth, with preset standards to determine adherence or departure of the material under test from those preset standards. In particular, the invention relates to such color comparator having automatic compensation for changes in distance between the light source or the detector element and the surface being measured.

2. Description of the Prior Art

Color comparators have, of course, been previously known and proposed. However, such prior art devices have suffered from deficiencies of various kinds, these deficiencies leading to inaccuracies and unreliability which have made the devices unsuitable for effective application. Principal among the problems of prior art devices have been the inability of the devices to adjust or compensate for changes in distance between the detector element or the light source and the surface under examination. Other problems have also involved the direct illumination of the detector from the light source and direct reflection from the surface under investigation to the detector, both the direct light and direct reflected light leading to the inaccuracies and unreliability in the system. Some of the prior art devices have recognized and made attempt to overcome the problems of direct illumination and direct reflected illumination of the detector. HOwever, these prior art devices have not provided any solution to the problem of inaccuracies resulting from changes in distance between the detector and the surface under investigation. Accordingly, these prior art devices are still unsuitable for precision application and reliable use. Typical examples of these prior art devices may be seen from Patents to Leimer et al. U.S. Pat. No. 2,962,956, Miller U.S. Pat. No. 2,358,020 and Smith U.S. Pat. No. 1,974,880.

SUMMARY OF THE INVENTION

The color comparator of the present invention includes a hand held sensing element and a tolerance band and indicator unit which is connected to the sensor element. The sensor has a light source and a photodetector encapsulated in suitable potting compound. The light source and the photodetector are apaced apart a predetermined distance. A light baffle extends along the outer surface of the potting compound and defines both an opening for radiation from the light source and a barrier appropriately and critically positioned between the light source and the light detector. An annular skirt surrounds the device so that ambient light can be excluded when the device is held against the surface being tested. The barrier or baffle between the light source and the photodetector serves a critical function of automatically providing for compensation in the event of changes in distance between the surface being examined and the detector. The barrier is positioned so as to restrict the field being illuminated by the light source and also to restrict the field being viewed by the photodetector, while at the same time providing for partial overlap of the restricted illuminated and viewing fields. In the event of a change in distance between the surface being examined and the detecor or the light source, the action of the barrier is such as to change the overlap as a function of the change in distance to maintain essentially constant the amount of light received by the detector. This amount adjustment assures that the scattered light received by the detector is independent of changes in distance whereby a highly accurate device is achieved which is accurate to within one-tenth of 1 percent.

The light barrier also serves to block or isolate the detector from all direct rays from the light source and also from all directly reflected rays from the surface being examined so that the detector sees only scattered light and is therefore highly accurate and sensitive.

Because of the automatic adjustment to keep constant the amount of light received by the detector and because of the blockage of all direct and directly reflected light the light received by the detector is a function only of the color of the surface being examined.

The output from the photodetector is delivered to the main unit where it is compared with preset high and low values determined by reference to a standard to be maintained. If the measured reflectance is above or below a predetermined range of values, determined by reference to the standard, a signal will be generated, such as the lighting of the lamp, to notify the operator that an unacceptable deviation has occurred.

Accordingly, one of the objects of the present invention is to provide a novel and improved color comparator wherein changes in distance from the surface being measured are automatically compensated.

Another object of the present invention is to provide a novel and improved color comparator of high accuracy and reliability.

Still another object of the present invention is to provide a novel and improved color comparator having a light source and a photodetector and which simultaneously isolates the photodetector from direct and direct reflected light from the light source while compensating for changes in distance from the surface being examined.

Other objects and advantages will be apparent and understood by those skilled in the art by the following detailed description and drawings.

DESCRIPTION OF THE PREFERRED EMBODIMENT

Figure 3:
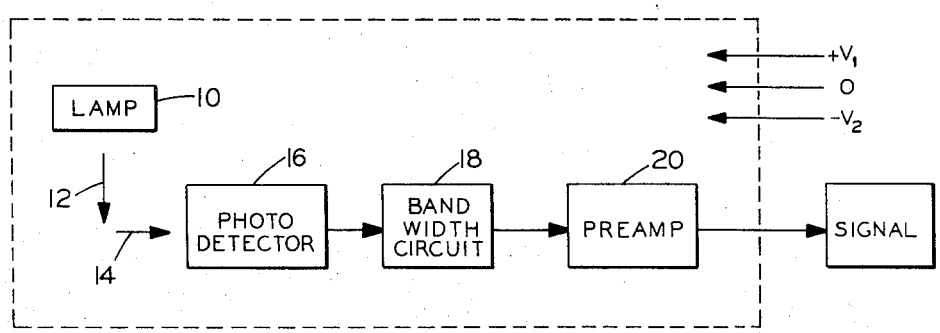
FIG. 3 is a block diagram of the sensor head.
Figure 4:
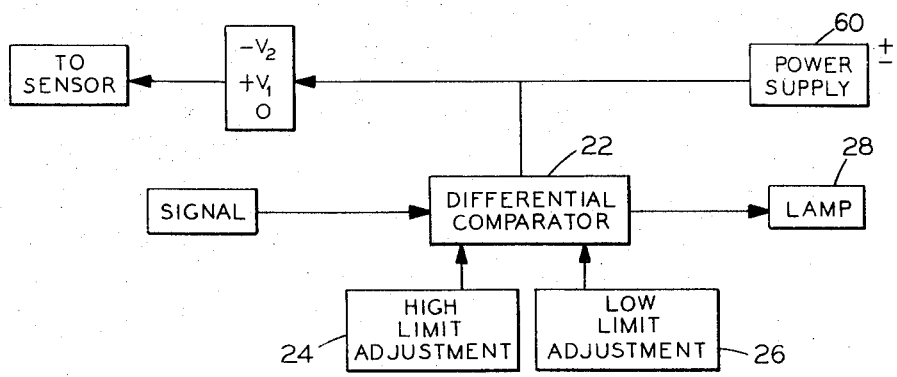
FIG. 4 is a block diagram of the tolerance band and indicator unit of the present invention.

Referring first to the block diagrams of FIGS. 3 and 4, the general mode of operation of the color comparator of the present invention is shown. A lamp 10 delivers light, indicated as beam 12, to a surface of material under investigation. Scattered light from the material under investigation, indicated as scattered light 14, is received by a photodetector 16 which generates an electrical signal commensurate with the light incident thereon. The output from photodetector 16 is delivered to a bandwidth filter circuit 18 which functions to filter out high frequency noise and deliver essentially a d.c. signal. The d.c. signal from bandwidth circuit 18 is then delivered to a preamplifier 20 where the signal is amplified for delivery to the tolerance band and indicator unit.

As shown in FIG. 4, the signal from preamplifier 20 is delivered to a differential comparator 22 of the tolerance band and indicator unit which has a high limit adjustment 24 and a low limit adjustment 26. Differential comparator 22 compares the input signal to it with the limits established by the high and low limit adjustments 24 and 26, and differential comparator 22 is connected to deliver a signal to a display unit such as lamp 28 to indicate whether the signal delivered to differential comparator 22 is within or outside the limits established by the high and low limit adjustments. The logic of the present invention is such that lamp 28 will be on if the signal is either below the low limit or above the high limit, but the lamp will be off if the signal is above the low limit and below the high limit. The off condition of the light indicates to the operator that the surface being tested is acceptable while the on condition of the light indicates that the surface is unacceptable.

Figure 1:
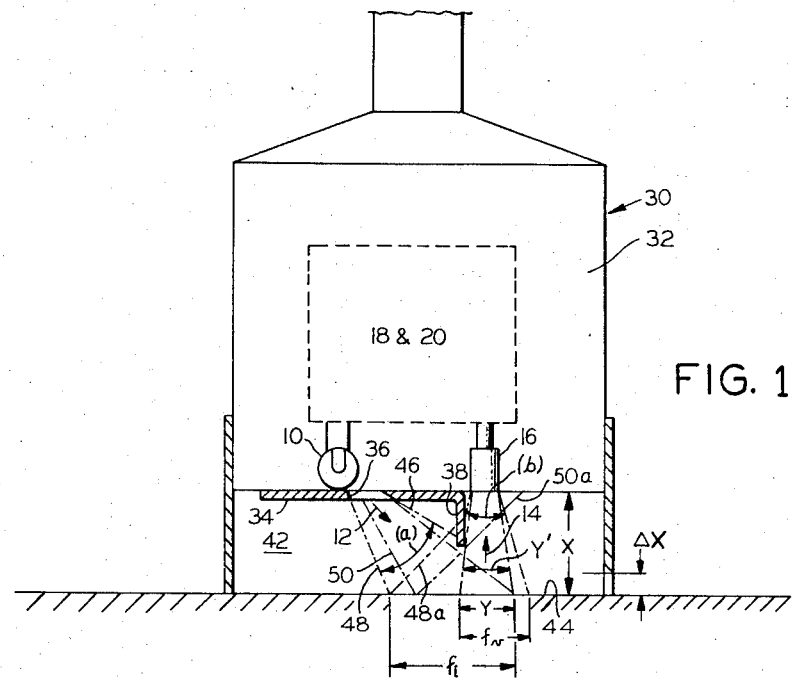
FIG. 1 is a cross-sectional view of the hand held sensor head of the color comparator of the present invention.

Referring now to FIG. 1, the details of the hand held sensor unit are shown. The sensor head, indicated generally at 30, has a body 32 of a suitable potting or encapsulating compound. Bandwidth circuit 18 and preamplifier 20 are encapsulated in body 20 as are lamp 10 and photodetector 16. Light 10 and detector 16 each communicate with appropriate openings at the surface of the potting compound to deliver light to and receive light from a surface to be examined. A light baffle 34 extends along the surface of the potting compound immediately adjacent light 10, the baffle being bonded or otherwise adhered to the potting compound. Baffle 34 has an opening 36 to define an aperture for light beam 12 from lamp 10, and baffle 34 also has a barrier element 38 extending from the end of the baffle between light 10 and detector 16. Body 32 is generally cylindrical in shape, and an annular skirt 40 extends along the outer surface of body 32 and beyond body 32 to define an open ended chamber 42. Skirt 40 serves to exclude ambient light when the sensor head is placed against a surface 44 which is to be examined or tested, such as a sheet of wallpaper.

The position and direction of barrier 38 are critical in that it must extend away from both lamp 10 and detector 16 and extend into and restrict both the otherwise unrestricted field of illumination of lamp 10 and the otherwise unrestricted field of view of detector 16. In this regard, the otherwise unrestricted field of illumination of lamp 10 will be understood to be the full cone or beam of light passing through opening 36, and the otherwise unrestricted field of view of detector 16 will be the full cone or other included configuration within which signals could be delivered to and sensed by detector 16, while the restricted field of illumination of lamp 10 and the restricted field of view of detector 16 will be as reduced by the barrier 38. Lamp 10 may be any suitable light source, and detector 16 may be any suitable photodetector such as, for example, a phototransistor or a photodiode, The included span of the field of illumination from light 10 is indicated as ($a$), and the included span of the field of view of the detector 16 is indicated as ($b$).

As can be seen from an examination of FIG. 1, barrier 38 extends into the beam of light from lamp 10 and intersects the upper boundary ray 46 of the light beam. The lower boundary ray 48 of the light beam is reflected from surface 44 and directed upwardly towards detector 16. However, these lower reflected rays (schematically indicated as 48a) are also intercepted by barrier 38. The position of barrier 38 with respect to the light from lamp 10 is such that all direct light which might reach detector 16 is blocked, and all reflected light from surface 44 which might reach detector 16 is also blocked. The lowermost part of the light beam which is reflected from surface 44 and is not intercepted by barrier 38 is indicated as ray 50 and 50a. As can be seen, the angle of reflection of this ray is such that ray 50($a$) passes to the right of detector 16 and thus is not incident on or seen by the detector. Accordingly, no direct light from lamp 10 reaches detector 16, and no directly reflected light from surface 44 reaches detector 16; from lamp 10 which is incident on and scattered by surface 44 can be detected by detector 16.

The restricted field of view of detector 16 is indicated by the included span ($b$), and thus detector 16 views the scattered light from surface 44. The restricted illuminated field on surface 44 is indicated as $f_i$, and the restricted viewed field on surface 44 is indicated as $f_v$. The overlap between $f_v$ and $f_i$ is indicated as $y$.

Figure 2:
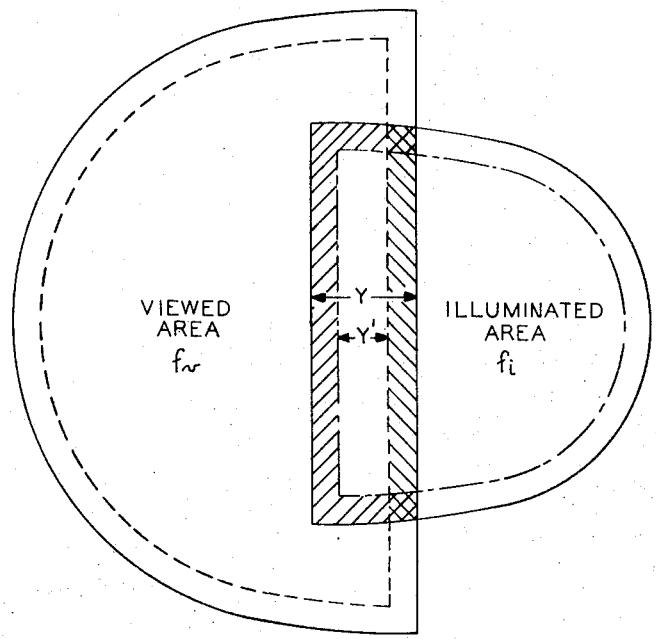
FIG. 2 is a diagramatic representation of overlapping viewed and illuminated areas in accordance with the present invention.

Referring now to FIG. 2, the restricted fields are diagramatically illustrated. Referring first to the restricted illuminated field, and bearing in mind that the light beam is inclined to surface 44, The illuminated field is approximately in the shape of an ellipse with one end truncated or cut off by barrier 38. Similarly, since detector 16 is lined up with its axis approximately normal to surface 44, the shape of the restricted viewed field is approximately circular with one side also truncated or cut off by barrier 38. The overlap, $y$, of the area which is both illuminated and viewed results in the signal being generated by detector 16, and the fact and degree of overlap is of utmost importance because of the way in which the barrier 38 operates to change the area of overlap to maintain the accuracy of the device.

Still referring to FIG. 2, the solid lines define both $f_v$ and $f_i$ for the configuration shown in FIG. 1 wherein the surface 44 to be examined is spaced a distance $x$ from detector 16. With the condition shown in FIG. 1, i.e., a constant $x$ separation between the surface under investigation and detector 16, consistently accurate readings will be obtained. However, a serious problem of maintaining that accuracy arises in the event the distance $x$ between surface 44 and detector 16 varies as a result, for example, of a change in pressure at which the operation is holding sensor 30 against surface 44 or a wrinkle, bulge or other variation in surface 44. The present invention overcomes this serious problem by the operation and action of barrier 38 which functions to maintain an essentially constant relationship between the surface illumination per unit area (I) of surface 44 and the area of overlap (y) of the viewed and illuminated fields, the desired function being to assure that the light received by detector 16 is independent of changes in distance x. Expressed mathematically, barrier 38 operates so that $I/y \approx$ Constant; and thus the light L received by the detector is constant with changes in X, i.e., L $(f(x)) \approx$ constant for a limited range of X. If, for example, surface 44 moves closer to detector 16, i.e., $X$ decreases by $\Delta x$, then the amount of light received by surface 44 will increase as a function of $\Delta x^2$. Similarly, the amount of light received by detector 16 will also increase as a function of $\Delta x^2$. Thus, the light received by and the signal generated by detector 16 will increase as a function of $\Delta x^4$ unless compensation is provided. The required compensation is accomplished in the present invention by the action and operation of barrier 38 which functions to change the area of the overlapped restricted viewed and illuminated fields as an approximate function of the inverse of the fourth power of $\Delta x$. This compensated change in the overlap of the viewed and illuminated fields results in essentially a constant amount of light reaching detector 16 from a particular area of surface 44 under investigation regardless of the distance x between the surface and the detector.

The solid lines in FIG. 2 show the viewed field and the illuminated field for the condition shown in FIG. 1 wherein surface 44 is separated by distance x from detector 16. At that condition, the area of overlap between the viewed and illuminated areas is indicated at y and includes the entire area within the approximately rectangle defined by the solid lines where the fields overlap. If x decreases by $\Delta x$, barrier 38 functions to reduce both the restricted viewed field and the restricted illuminated field on the surface under investigation by narrowing the span of the field of view and the span of the field of illumination. These reduced fields are indicated at the dashed lines in FIG. 2, and the area of overlap is indicated by the y'. Only the area within the approximate rectangle defined by the dotted lines in the overlapped area of the two fields is both illuminated and viewed, and this reduced area is reduced as an approximately fourth power function of $\Delta x$ so as to retain a constant light input to detector 16 for a given test area on surface 44. In this way, the device of the present invention functions to provide accuracy to within one-tenth of 1 percent in performing its color comparison function. Of course, if the distance x should increase, the illumination of a given area on surface 44 will decrease as the square of the change in distance, and the light received from detector 16 will decrease as the fourth power of the change; proper compensation will result from the fact that the overlapping of the viewed and illuminated fields will also increase as the fourth power of the change in distance so that the light input to detector 16 will again remain constant.

Figure 5:
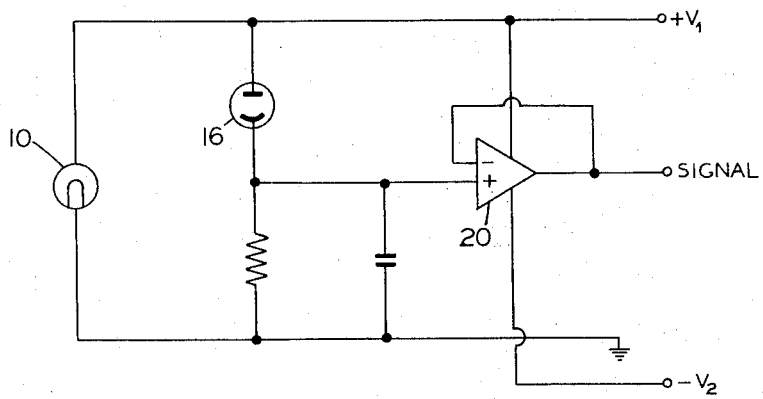
FIG. 5 is an electrical schematic of the sensor head.

Referring now to FIG. 5, the electronics of the sensor head is shown. The light from lamp 10 which is scattered at surface 44 and received by detector 16 results in an output from detector 6 which is delivered to amplifier 20 via bandwidth filter circuit 18 consisting of a resistor and capacitor in parallel. Bandwidth circuit 18 functions to filter out high frequency noise so that essentially a d.c. input is delivered to amplifier 20.

Figure 6:
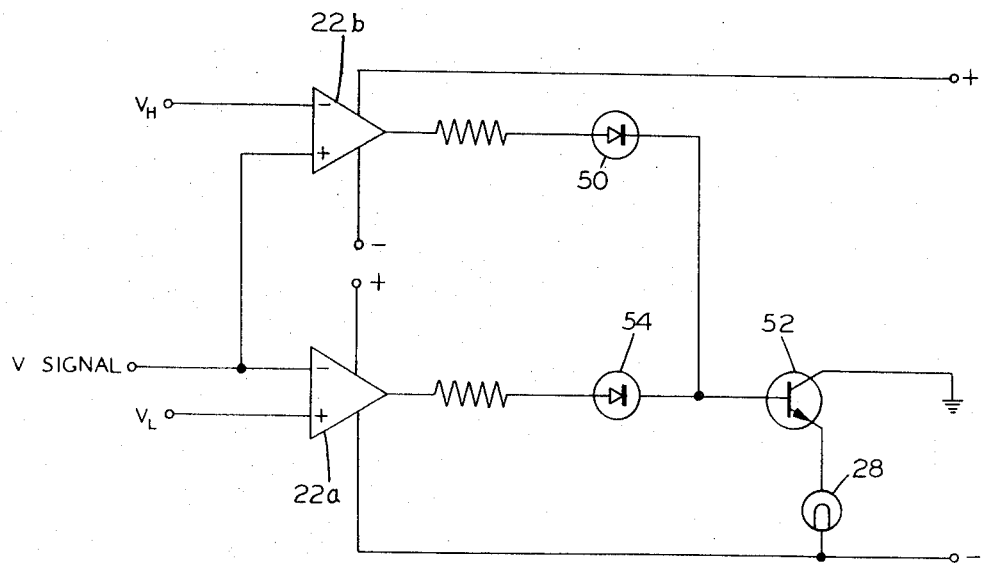
FIG. 6 is an electrical schematic of the tolerance band and indicator unit of the present invention.

The signal $V_{sig}$ from amplifier 20 is then delivered to the tolerance band and indicator unit where it is delivered to operational amplifiers 22a and 22b (see FIG. 6) of differential comparator 22. Operational amplifiers 22a and 22b and amplifier 20 of the sensor head are all integrated circuit operational amplifiers, Model 741, obtainable from Fairchild Semiconductor Division of Fairchild Camera and Instrument Corporation, Mountainview, Calif. Amplifiers 22a and 22b are connected to function as a comparator, and they form differential comparator 22. A high level input bias $V_H$ is delivered to the negative side of amplifier 22b to bias the amplifier against the signal input $V_{sig}$ at the positive terminal; and a low level input bias $V_L$ is delivered to the positive side of amplifier 22a to bias the amplifier against the signal input $V_{sig}$ at the negative side. $V_H$ and $V_L$ are reference levels determined by a standard for the surface to be tested. $V_H$ represents the maximum acceptable light reflectance from surface 44, and $V_L$ represents the lowest acceptable light reflectance from the surface. The voltage range between $V_H$ and $V_L$ represents the acceptable range of light reflectance from the surface. If light reflectance from the surface is within that acceptable range, then the material being sampled is acceptable. If the reflectance is above $V_H$ or below $V_L$, i.e., if it results in an output signal from the sensor above $V_H$ or below $V_L$ then the surface being examined is unacceptable. If the output signal from the sensor head is above $V_H$, amplifier 22b will turn on diode 50 which will then turn on transistor 52 and illuminate lamp 28. If the output signal from the sensor head is below $V_L$, amplifier 22a will turn on diode 54 which will then turn on transistor 52 to illuminate light 28. If the output signal from the sensor head is above $V_L$ and below $V_H$, and thus within the acceptable range, neither amplifier 22a nor amplifier 22b will be conducting, and thus lamp 28 will be off. The off condition of light 28 notifies the operator that the surface under investigation is acceptable.

Figures 8A, 8B:
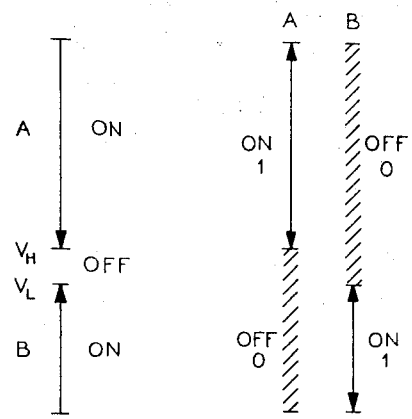
FIGS. 8A and 8B are a diagramatic representation of the logic operation of the tolerance band indicator.

The logic of the tolerance band and indicator circuit is shown in FIGS. 8a and 8b. In FIG. 8a it is seen that the lamp 28 is on for condition A, i.e., a voltage level above $V_H$ and on for condition B, i.e., a voltage level below $V_L$. The lamp is off for the condition between $V_L$ and $V_H$. FIG. 8B shows the logic for conditions A and B expressed comparatively wherein the solid lines for conditions A and B indicate an on condition for light 28 and the dashed lines indicate an off condition for the light. As can be seen, light 28 will be on for either condition A or condition B, and the light will be off only when neither condition A nor condition B is present.

Figure 7:
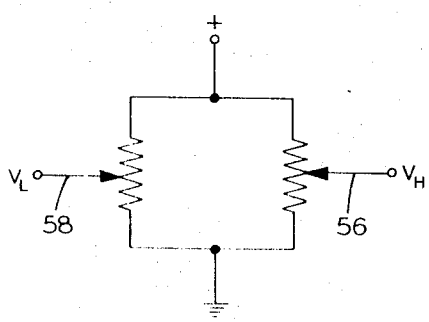
FIG. 7 is an electrical schematic of the adjustment circuit for the tolerance band indicator.

Since it will often be desired to vary the levels $V_H$ and $V_L$ either for different samples or to change the tolerance band, a combined adjusting circuit for high limit adjustment 24 and low limit adjustment 26 are shown in FIG. 7. $V_H$ and $V_L$ are both simply generated as voltage levels at the contacts 56 and 58 of variable potentiometers.

While the present invention has been shown employing direct illumination and detection devices, a fiber optic arrangement can also be employed wherein both the light source and the detector are not in direct communication with the surface under investigation. In this arrangement, fiber optic arrangements would be employed to conduct the illuminating light from the light source to the surface under investigation, and a fiber optic element would be employed to deliver the scattered light to the photodetector. Also, the light source and light detector, instead of being arranged in side-by-side relationship, can be arranged coaxially or concentrically with appropriate optical elements to deliver the light to the surface under investigation in a desired manner. In any of these alternative arrangements the light barrier, or an equivalent thereof of possible varying shape, would still be employed to perform its critical function.

As shown in FIG. 4, a common power supply 60 supplies all units of the system at the desired power levels of $+V_1$, $-V_2$ and 0 (ground).

While a preferred embodiment has been shown and described, various modifications and substitutions can be made thereto without departing from the spirit and scope of the present invention. Accordingly, it is to be understood that the present invention has been described by way of illustration and not limitation.

What is claimed is:

1. A distance compensated reflectance sensor element including an enclosure defining an opening adapted to be held against a surface to be investigated and to establish a surface position which may vary relative to said enclosure; illuminating means in said sensor element spaced from said opening for illuminating the surface to be investigated and establishing a field of illumination; detector means in said sensor element spaced from said opening for viewing the surface to be investigated and establishing a field of viewing, said illuminating field and said viewing field being at least partly overlapping said detector means being adapted for generating a signal commensurate with light incident thereon, said fields overlapping on said surface when it is in said surface position, means restricting said fields so that no rays from the illuminating means impinge directly upon the detector means and so that no rays reflected by the surface impinge upon the detector means, the area of said overlapping on said surface being of predetermined value when said surface position is a predetermined distance from said detector means, and means for varying said area of overlapping directly with the variation of said distance whereby the light impinging upon the detector means is substantially independent of said distance.

2. The invention as defined in claim 1 wherein said fields are divergent and wherein said means for varying said area is a barrier with a bounding edge extending into the fields of the illumination means and the detector means.

3. The invention as defined in claim 2 including indicating means connected with said detector means for indicating the relative value of said signal.

4. The invention as defined in claim 2 including comparator means for receiving said signal from said detector means and comparing said signal with a desired standard; and indicator means connected with said comparator means for indicating adherence to or deviation from said standard.

5. The invention as defined in claim 4 wherein said comparator means includes differential comparator means for establishing upper and lower limits for the surface to be investigated and for comparing said signal from said detector with said limits; and wherein said differential comparator means drives said indicator means to a first state when said signal is above said upper limit or below said lower limit and to a second state when said signal is between said limits.

6. The invention as defined in claim 5 wherein said differential comparator is adjustable to define variable upper and lower limits.

* * * * *